(12) United States Patent
Igarashi et al.

(10) Patent No.: US 10,651,711 B2
(45) Date of Patent: May 12, 2020

(54) MAGNETLESS ROTARY ELECTRIC MACHINE

(71) Applicant: TOYOTA JIDOSHA KABUSHIKI KAISHA, Toyota-shi, Aichi-ken (JP)

(72) Inventors: Hidekazu Igarashi, Toyota (JP); Eiji Yamada, Owariasahi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 520 days.

(21) Appl. No.: 15/514,256

(22) PCT Filed: Sep. 29, 2015

(86) PCT No.: PCT/IB2015/001712
§ 371 (c)(1),
(2) Date: Mar. 24, 2017

(87) PCT Pub. No.: WO2016/051250
PCT Pub. Date: Apr. 7, 2016

(65) Prior Publication Data
US 2018/0358873 A1    Dec. 13, 2018

(30) Foreign Application Priority Data
Oct. 2, 2014   (JP) ................. 2014-203677

(51) Int. Cl.
*H02K 17/12*    (2006.01)
*H02K 11/042*   (2016.01)
(Continued)

(52) U.S. Cl.
CPC ............... *H02K 17/12* (2013.01); *H02K 1/14* (2013.01); *H02K 1/24* (2013.01); *H02K 11/042* (2013.01); *H02K 16/04* (2013.01); *H02P 27/06* (2013.01)

(58) Field of Classification Search
CPC ...... H02K 17/16; H02K 17/165; H02K 17/12; H02K 1/24; H02K 1/14; H02K 11/042; H02K 16/04; H02P 27/06
(Continued)

(56) References Cited

U.S. PATENT DOCUMENTS

| 4,851,758 A | * | 7/1989 | Osada | H02K 19/26 322/63 |
| 8,847,455 B2 | * | 9/2014 | Hiramoto | H02K 1/223 310/179 |

(Continued)

FOREIGN PATENT DOCUMENTS

| CN | 104065224 A | 9/2014 |
| JP | 2010-279165 A | 12/2010 |

(Continued)

*Primary Examiner* — Jermele M Hollington
*Assistant Examiner* — Ahmed Elnakib
(74) *Attorney, Agent, or Firm* — Sughrue Mion, PLLC (57) ABSTRACT

The magnetless rotary electric machine includes an annular rotor, an outer stator and an inner stator. The annular rotor includes an annular rotor yoke portion, outer salient poles, outer rotor coils, inner salient poles, inner rotor coils, first rectifying devices and second rectifying devices. The first salient pole is configured to be magnetized by an induction current induced by the first coil. Each of the first rectifying devices is configured to rectify current such that a direction of a magnetic pole of the first salient pole is a first direction. The second salient pole is configured to be magnetized by an induction current induced by the second coil. Each of the second rectifying devices is configured to rectify current such that an direction of a magnetic pole of the second salient pole is a second direction. The second direction is a reverse direction to the first direction.

2 Claims, 9 Drawing Sheets

(51) Int. Cl.
*H02K 16/04* (2006.01)
*H02K 1/14* (2006.01)
*H02K 1/24* (2006.01)
*H02P 27/06* (2006.01)

(58) Field of Classification Search
USPC ........... 310/68 D, 12.18, 166, 168, 171, 172, 310/179, 184, 195, 198, 208, 261.1, 266, 310/71, 106
See application file for complete search history.

(56) References Cited

U.S. PATENT DOCUMENTS

| | | | | | |
|---|---|---|---|---|---|
| 2011/0285238 | A1* | 11/2011 | Kusase | ................... | H02K 16/04 310/156.48 |
| 2012/0235621 | A1* | 9/2012 | Yamada | ................. | H02K 19/10 318/716 |
| 2012/0256510 | A1* | 10/2012 | Yamada | ................. | H02K 19/12 310/184 |
| 2012/0313492 | A1* | 12/2012 | Yamada | ................... | H02K 1/24 310/68 D |
| 2013/0334937 | A1* | 12/2013 | Yamada | ................. | H02K 19/10 310/68 D |
| 2014/0285057 | A1* | 9/2014 | Aoyama | ................... | H02K 3/28 310/210 |
| 2015/0288235 | A1* | 10/2015 | Tojima | ................... | H02K 16/04 310/46 |
| 2016/0294239 | A1* | 10/2016 | Yamada | ................. | H02K 16/04 |
| 2016/0294267 | A1* | 10/2016 | Yamada | ................. | H02K 16/04 |
| 2018/0358873 | A1* | 12/2018 | Igarashi | ............... | H02K 11/042 |

FOREIGN PATENT DOCUMENTS

| | | | |
|---|---|---|---|
| JP | 2011-244643 A | | 12/2011 |
| JP | 2013-38918 A | | 2/2013 |
| WO | WO 2014104184 | * | 7/2014 |

* cited by examiner

| | | | INNER WINDING CIRCUIT AND OUTER WINDING CIRCUIT (OI) | | |
|---|---|---|---|---|---|
| | | | INDEPENDENT | PARALLEL | SERIES |
| CIRCUMFERENTIALLY ADJACENT SALIENT POLE WINDINGS (LR) | LR INDEPENDENT | O<br>I<br>ONE COIL | (b) | (c) | (d) |
| | | O<br>TF COIL<br>I<br>ONE COIL | (e) | | |
| | | O<br>I<br>TF COIL | (f) | | |
| | LR CONNECTION | O<br>I<br>ONE COIL | | | |
| | | O<br>TF COIL<br>I<br>ONE COIL | | | (j) |
| | | O<br>I<br>TF COIL | (g) | (h) | (i) |

MAGNETLESS ROTARY ELECTRIC MACHINE

CROSS REFERENCE TO RELATED APPLICATIONS

This application is a National Stage of International Application No. PCT/IB2015/001712 filed Sep. 29, 2015, claiming priority based on Japanese Patent Application No. 2014-203677 filed Oct. 2, 2014, the contents of all of which are incorporated herein by reference in their entirety.

BACKGROUND OF THE INVENTION

1. Field of the Invention

The present invention relates to a magnetless rotary electric machine, and particularly to a double-stator magnetless rotary electric machine including an outer stator provided on a radially outer side relative to an annular rotor, and an inner stator on a radially inner side relative to the annular rotor.

2. Description of Related Art

As a magnetless rotary electric machine including a rotor that does not use a permanent magnet, there has been known such a configuration in which a rotor salient pole formed by winding a rotor coil around a rotor is provided, and an induction current is generated in the rotor coil by a field system from a stator, so as to magnetize the rotor salient pole by the induction current.

As a magnetless motor, Japanese Patent Application Publication No. 2010-279165 (JP 2010-279165 A) describes such a configuration that a rotor placed in a magnetic field formed by a stator so as to be rotated by the magnetic field is provided, and a salient pole of the rotor includes an induction coil placed near a gap with respect to the stator, and a common coil provided separately from the induction coil and placed away from the stator.

As a technique related to the present invention, Japanese Patent Application Publication No. 2011-244643 (JP 2011-244643 A) describes a double-stator motor in which a permanent magnet magnetized in a circumferential direction is placed in an annular rotor, an inner stator is provided inside the rotor, an outer stator is provided outside the rotor, and the inner and outer stators each include a three-phase coil connected in Y-connection.

The magnetless rotary electric machine has such an advantage that expensive magnet materials are not used, but copper loss occurs due to a rotor coil and a characteristic of a magnetic pole magnetized by an induction current is not so strong as a permanent magnet. In view of this, further output improvement is expected.

SUMMARY OF THE INVENTION

The present invention provides a magnetless rotary electric machine that can achieve further output improvement.

The magnetless rotary electric machine related to the present invention includes an annular rotor, an outer stator and an inner stator. The annular rotor includes an annular rotor yoke portion, outer salient poles, outer rotor coils, inner salient poles, inner rotor coils, first rectifying devices and second rectifying devices. The outer salient poles are provided on a radially outer side of the rotor yoke portion. The outer rotor coils are wound around the outer salient poles, respectively. The inner salient poles are provided on a radially inner side of the rotor yoke portion. The inner rotor coils are wound around the inner salient poles, respectively. The outer stator is placed so as to face a radially outer side of the annular rotor, the outer stator including outer exciting coils. The inner stator is placed so as to face a radially inner side of the annular rotor, the inner stator including inner exciting coils. The inner salient poles and the outer salient poles each include a first salient pole and a second salient pole adjacent to each other. A first coil is wound around the first salient pole and a second coil is wound around the second salient pole. The first salient pole is configured to be magnetized by an induction current induced by the first coil. Each of the first rectifying devices is configured to rectify current such that a direction of a magnetic pole of the first salient pole is a first direction. The second salient pole is configured to be magnetized by an induction current induced by the second coil. Each of the second rectifying devices is configured to rectify current such that an direction of a magnetic pole of the second salient pole is a second direction. The second direction is a reverse direction to the first direction.

In the magnetless rotary electric machine configured as such, rotor salient poles each including a rotor coil wound therearound are provided on each of a radially outer side and a radially inner side of an annular rotor, an outer stator is placed on a radially outer side relative to the annular rotor, and an inner stator is placed on a radially inner side relative to the annular rotor. Hereby, the annular rotor generates torques between the annular rotor and the inner stator and between the annular rotor and the outer stator, thereby improving an output of the magnetless rotary electric machine.

The first winding circuit of the inner salient pole may be connected in parallel or in series to a first winding circuit of the outer salient pole, such that one first rectifying device is arranged in a pair of the first winding circuit of the inner salient pole and the first winding circuit of the outer salient pole. The first winding circuit may include the first coil and the first rectifying device. The second winding circuit of the inner salient pole may be connected in parallel or in series to a second winding circuit of the outer salient pole, so that one second rectifying device is arranged in a pair of the second winding circuit of the inner salient pole and the second winding circuit of the outer salient pole. The second winding circuit may include the second coil and the second rectifying device.

In the magnetless rotary electric machine according to the present invention, an inner winding circuit is connected in parallel or in series to an outer winding circuit in the annular rotor. Hereby, the rectifying device of the inner winding circuit and the rectifying device of the outer winding circuit can be integrated into one. This makes it possible to achieve cost reduction.

Each of the first coil and the second coil in at least either ones of the inner salient poles and the outer salient poles may include an induction coil and a common coil. The induction coil may be wound around a root side of each of the first salient pole and the second salient pole. The common coil may be wound around a tip side of each of the first salient pole and the second salient pole in the same winding direction as the induction coil.

In the magnetless rotary electric machine according to the present invention, a rotor coil is constituted by an induction coil wound around a tip side of the salient pole, and a common coil wound around a root part of the salient pole, in a divided manner. An induction current generated by a field system from the stator becomes stronger on a tip end of the salient pole, but becomes weaker on the root side. Accordingly, a main role of the induction coil is to generate an induction current by the field system from the stator, and a main role of the common coil is to magnetize the salient pole by the induction current so that the salient pole serves as a magnetic pole. By setting a ratio between a winding number of the induction coil and a winding number of the common coil appropriately, it is possible to achieve improvement of efficiency of the magnetless rotary electric machine.

Each of the inner salient poles and the outer salient pole may include a first winding circuit and a second winding circuit. The first winding circuit may include the first coil and the first rectifying device. The second winding circuit may include the second coil and the second rectifying device. Each of the first coil and the second coil may include the induction coil and the common coil. The first winding circuit may be connected to the second winding circuit so as to form a T-shape. A common coil portion may include a first common coil of the first winding circuit and a second common coil of the second winding circuit. The first common coil may be connected in series to the second common coil. A first terminal of a first induction coil of the first winding circuit may be connected to an anode of the first rectifying device. A first terminal of a second induction coil of the second winding circuit may be connected to an anode of the second rectifying device. A second terminal of the first induction coil and a second terminal of the second induction coil may be connected to a first terminal of the common coil portion. A cathode of the first rectifying device and a cathode of the second rectifying device may be connected to a second terminal of the common coil portion.

In the magnetless rotary electric machine according to the present invention, in terms of each of the first salient pole and the second salient pole adjacent to each other along a circumferential direction, a first winding circuit and a second winding circuit each constituted by an induction coil, a common coil, and a rectifying device are connected to each other. Respective common coils of the first winding circuit and the second winding circuit are connected in series to each other so as to form a T-shaped circuit. In each of the first winding circuit and the second winding circuit, an induction current is half-wave rectified, but with the above circuit configuration, the induction current is full-wave rectified. Hereby, each of the salient poles is strongly magnetized and a magnetic pole characteristic is improved, thereby making it possible to markedly improve the output of the magnetless rotary electric machine.

An inner T-shaped circuit of the inner salient pole may be connected in parallel or in series to an outer T-shaped circuit of the outer salient pole, such that one first rectifying device and one second rectifying device are arranged in a pair of the inner T-shaped circuit and the outer T-shaped circuit.

In the magnetless rotary electric machine according to the present invention, an inner T-shaped circuit formed in the inner salient poles is connected in parallel or in series to an outer T-shaped circuit formed in the outer salient poles. Hereby, the rectifying device of the inner T-shaped circuit and the rectifying device of the outer T-shaped circuit can be integrated into one, thereby making it possible to achieve cost reduction.

Each of the first coil and the second coil in either ones of the inner salient poles and the outer salient poles may include the induction coil and the common coil. The other ones of the inner salient poles and the outer salient poles may include a third coil wound around the first salient pole and a fourth coil wound around the second salient pole. A common coil portion may include a first common coil of the first coil, a second common coil of the second coil, the third coil, and the fourth coil. The first common coil, the second common coil, the third coil, and the fourth coil may be connected in series to each other. A first terminal of a first induction coil of the first coil may be connected to an anode of the first rectifying device. A first terminal of a second induction coil of the second coil may be connected to an anode of the second rectifying device. A cathode of the first rectifying device and a cathode of the second rectifying device may be connected to a second terminal of the common coil portion. A second terminal of the first induction coil and a second terminal of the second induction coil may be connected to a first terminal of the common coil portion.

In the magnetless rotary electric machine according to the present invention, in terms of either ones of the inner salient poles and the outer salient poles, the first coil and the second coil both include an induction coil and a common coil, but in terms of the other ones of the inner salient poles and the outer salient poles, no induction coil is provided. In this configuration, the first winding circuit is connected to the second winding circuit on an inner-salient-pole side, the first winding circuit is connected to the second winding circuit on an outer-salient-pole side, and the inner-salient-pole side and the outer-salient-pole side are connected in series to each other. Hereby, a rectifying device on the inner-salient-pole side and a rectifying device of the outer salient pole side can be commonized. Further, a common coil of the first coil including an induction coil, a common coil of the second coil including an induction coil, the third coil that does not include an induction coil, and the fourth coil that does not include an induction coil are connected in series to each other, so as to form a common coil portion. Since the third coil and the fourth coil do not include the induction coil, winding numbers can be increased by just that much. Accordingly, each salient pole can be magnetized strongly by use of the induction current effectively, thereby improving a magnetic pole characteristic and improving the output of the magnetless rotary electric machine markedly.

An outer three-phase inverter circuit may be connected to the outer exciting coils of the outer stator. An inner three-phase inverter circuit may be connected to the inner exciting coils of the inner stator.

The number of inner salient poles may be the same as the number of outer salient poles. One three-phase inverter circuit may be connected to the outer exciting coils of the outer stator and the inner exciting coils of the inner stator.

In the magnetless rotary electric machine according to the present invention, the outer three-phase inverter circuit is connected to the exciting coils of the outer stator, and the inner three-phase inverter circuit is connected to the exciting coils of the inner stator. Further, at the time when the number of inner salient poles of the annular rotor is the same as the number of outer salient poles, one three-phase inverter circuit is connected to the exciting coils of the outer stator and the exciting coils of the inner stator, thereby making it possible to reduce a cost of the inverter circuit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a view illustrating a configuration of a magnetless rotary electric machine according to an embodiment of the present invention: (a) in FIG. 1 is an overall configuration diagram; (b) in FIG. 1 is a view illustrating a winding circuit constituted by a coil and a rectifying device for each of four salient poles on an outer-salient-pole side (an O-side), on an inner-salient-pole side (an I-side), and on two salient-pole sides (an L-side and an R-side) adjacent to each other in a circumferential direction; (c) in FIG. 1 is a configuration diagram in which a winding circuit on the O-side is connected in parallel to a winding circuit on the I-side in (b) in FIG. 1; (d) in FIG. 1 is a configuration diagram in which the winding circuit on the O-side is connected in series to the winding circuit on the I-side in (b) in FIG. 1; (e) in FIG. 1 is a view in which a coil on the O-side is constituted by an induction coil and a common coil in (b) in FIG. 1; (0 in FIG. 1 is a view in which a coil on the O-side and a coil on the I-side are each constituted by an induction coil and a common coil in (b) in FIG. 1; (g) in FIG. 1 is a view in which, in (f) in FIG. 1, a winding circuit on the L-side is connected to a winding circuit on the R-side so as to connect a common coil on the L-side in series to a common coil on the R-side, thereby forming one T-shaped circuit on the O-side and one T-shaped circuit on the I-side; (h) in FIG. 1 is a configuration diagram in which the T-shaped circuit on the O-side is connected in parallel to the T-shaped circuit on the I-side in (g) in FIG. 1; (i) in FIG. 1 is a configuration diagram in which the T-shaped circuit on the O-side is connected in series to the T-shaped circuit on the I-side in (g) in FIG. 1; and (j) in FIG. 1 is a view illustrating a configuration in which an induction coil on the I-side is omitted;

DETAILED DESCRIPTION OF EMBODIMENTS

Hereinafter, an embodiment of the present invention is described in detail with reference to the drawings. The number of poles, the number of salient poles, a winding ratio between an induction coil and a common coil, and the like described below are just examples for descriptions, and can be modified appropriately in accordance with a specification of a magnetless rotary electric machine. In the following description, similar elements in all the drawings have the same reference sign and redundant descriptions thereof are omitted.

Figure 1:
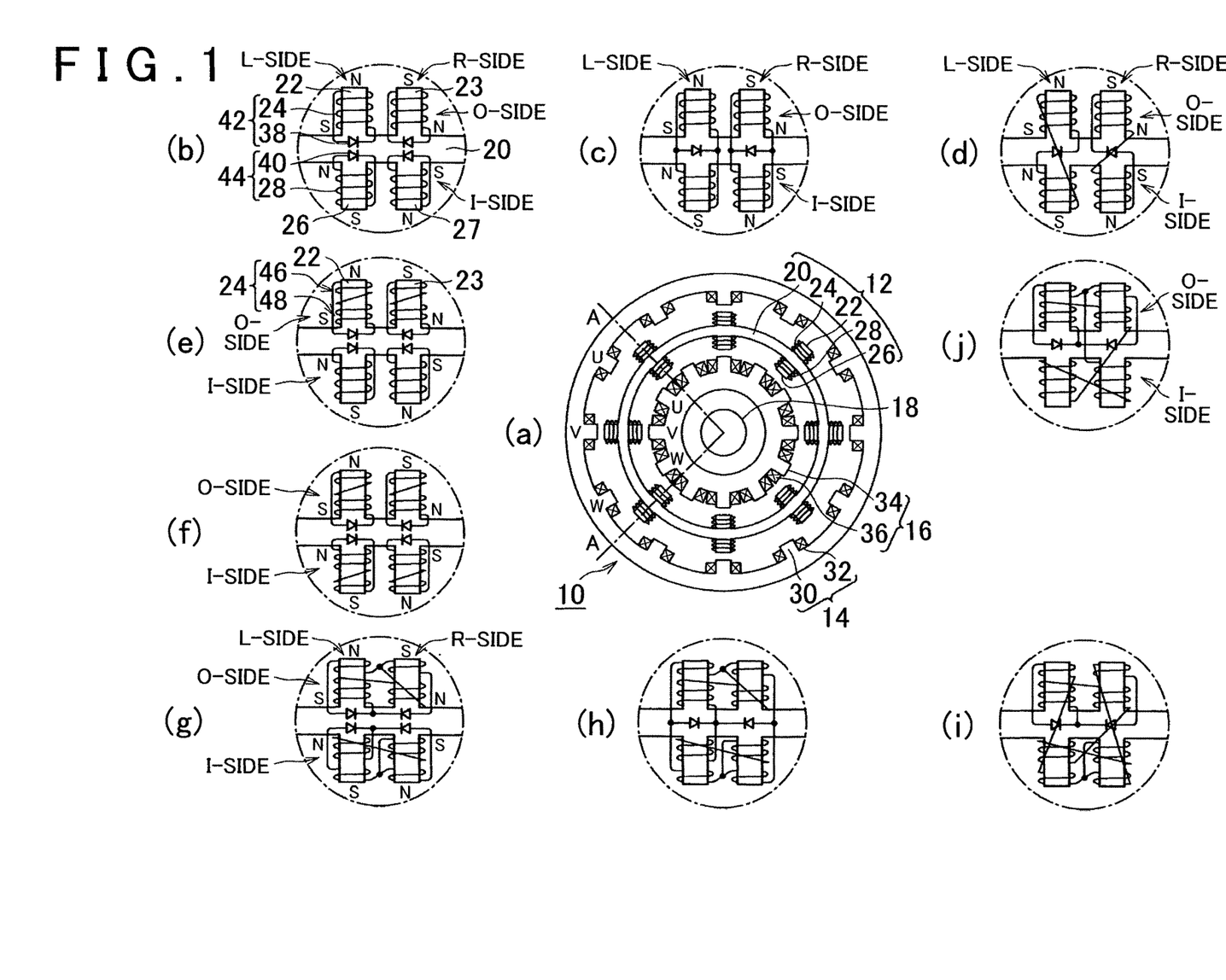

FIG. 1 is a configuration diagram of a magnetless rotary electric machine 10. In the following description, the magnetless rotary electric machine 10 is referred to as a rotary electric machine 10 unless otherwise specified. (a) in FIG. 1 is a view illustrating an overall configuration of the rotary electric machine 10, and is a sectional view perpendicular to an axial direction of the rotary electric machine 10. (b) to (j) in FIG. 1 are views illustrating some exemplary configurations of a winding circuit.

The rotary electric machine 10 is a four-pole three-phase synchronous rotary electric machine and does not include a permanent magnet as a magnetic pole. The rotary electric machine 10 includes an annular rotor 12, an outer stator 14 placed so as to face a radially outer side of the annular rotor 12, an inner stator 16 placed so as to face a radially inner side of the annular rotor 12, and an output shaft 18. The outer stator 14 and the inner stator 16 are fixed to a motor case (not shown), and the output shaft 18 is rotatably supported by the motor case. The annular rotor 12 and the output shaft 18 are configured integrally. The annular rotor 12 rotates in a space between the outer stator 14 and the inner stator 16, and its torque is output to the output shaft 18.

A range of one pole is indicated by A-A in (a) in FIG. 1. An angle in the range of A-A is 90 degrees, and the number of poles is 4.

The annular rotor 12 includes an annular rotor yoke portion 20, a plurality of outer salient poles 22 provided along a radially outer side of the rotor yoke portion 20, a plurality of outer rotor coils 24 each wound around each of the plurality of outer salient poles 22, a plurality of inner salient poles 26 provided along a radially inner side of the rotor yoke portion 20, and a plurality of inner rotor coils 28 each wound around each of the plurality of inner salient poles 26. The plurality of outer salient poles 22 and the plurality of inner salient poles 26 are placed at opposed positions on opposite sides across the rotor yoke portion 20. The outer rotor coil 24 and the inner rotor coil 28 are wound around the outer salient pole 22 and the inner salient pole 26, respectively, by concentrated winding.

One outer magnetic pole pair of the annular rotor 12 is constituted by two outer salient poles 22 adjacent to each other along a circumferential direction. Since the number of poles is 4, a total number of the outer salient poles 22 is 8. Similarly, one inner magnetic pole pair of the annular rotor 12 is constituted by two inner salient poles 26 adjacent to each other along the circumferential direction. Since the number of poles is 4, a total number of the inner salient poles 26 is 8.

The outer stator 14 includes a plurality of outer stator salient poles 30 provided along a radially inner side of an annular outer stator yoke portion, and a plurality of outer exciting coils 32 each wound around each of the plurality of outer stator salient poles 30. The plurality of outer stator salient poles 30 is placed so as to face the outer salient poles 22 of the annular rotor 12.

The plurality of outer exciting coils 32 is constituted by a U-phase winding coil, a V-phase winding coil, and a W-phase winding coil. Three outer stator salient poles 30 are placed in the range of A-A, which is a single-pole range. The three outer stator salient poles 30 in the single-pole range include a U-phase salient pole around which the U-phase winding coil is wound, a V-phase salient pole around which the V-phase winding coil is wound, and a W-phase salient pole around which the W-phase winding coil is wound. In the three outer stator salient poles 30 in the range of A-A in FIG. 1, respective positions of the U-phase, the V-phase, and the W-phase are illustrated. Accordingly, a total number of the outer stator salient poles 30 is 12, which is 3/2 times the total number of the outer salient poles 22 of the annular rotor 12. The U-phase winding coil, the V-phase winding coil, the W-phase winding coil are wound around the U-phase salient pole, the V-phase salient pole, and the W-phase salient pole, respectively, by distributed winding.

The inner stator 16 includes a plurality of inner stator salient poles 34 provided along a radially outer side of an annular inner stator yoke portion, and a plurality of inner exciting coils 36 each wound around each of the plurality of inner stator salient poles 34. The plurality of inner stator salient poles 34 is placed so as to face the inner salient poles 26 of the annular rotor 12.

The plurality of inner exciting coils 36 is constituted by a U-phase winding coil, a V-phase winding coil, and a W-phase winding coil. Three inner stator salient poles 34 are placed in the range of A-A, which is a single-pole range. The three inner stator salient poles 34 in the single-pole range include a U-phase salient pole around which the U-phase winding coil is wound, a V-phase salient pole around which the V-phase winding coil is wound, and a W-phase salient pole around which the W-phase winding coil is wound. Respective positions of the U-phase, the V-phase, and the W-phase are illustrated in the three inner stator salient poles 34 in the range of A-A in FIG. 1. Accordingly, a total number of the inner stator salient poles 34 is 12, which is 3/2 times a total number of the inner salient poles 26 of the annular rotor 12. The U-phase winding coil, the V-phase winding coil, the W-phase winding coil are wound around the U-phase salient pole, the V-phase salient pole, and the W-phase salient pole, respectively, by distributed winding.

The outer rotor coil 24 wound around the outer salient pole 22 of the annular rotor 12 receives a field system formed by the outer exciting coil 32 of the outer stator 14, so as to generate an induction current. The outer salient pole 22 is magnetized by the induction current, so that a magnetic pole is formed. In collaboration with the magnetic pole thus formed and the field system from the outer stator 14, the annular rotor 12 generates a torque. Similarly, the inner rotor coil 28 wound around the inner salient pole 26 of the annular rotor 12 receives a field system formed by the inner exciting coil 36 of the inner stator 16, so as to generate an induction current. The inner salient pole 26 is magnetized by the induction current, so that a magnetic pole is formed. In collaboration with the magnetic pole thus formed and the field system from the inner stator 16, the annular rotor 12 generates a torque.

Thus, a permanent magnet is not placed in the annular rotor 12, but a torque is generated. This is a torque generation principle of the magnetless rotary electric machine 10.

(b) to (j) in FIG. 1 are examples of a configuration diagram of winding circuits in the rotary electric machine 10. Among them, (b) is a view illustrating a basic configuration. In (b), one magnetic pole includes two outer salient poles 22, 23 and two inner salient poles 26, 27. Hereinafter, in order to distinguish salient poles adjacent to each other along the circumferential direction, one side is referred to as an L-side, and the other side is referred to as an R-side, and further, a radially outer side across the annular rotor yoke portion 20 is referred to as an O-side, and a radially inner side is referred to as an I-side. An L-side outer salient pole 22 is a one-side salient pole on the O-side, and an R-side outer salient pole 23 is an other-side salient pole on the O-side. Similarly, an L-side inner salient pole 26 is a one-side salient pole on the I-side, and an R-side inner salient pole 27 is an other-side salient pole on the I-side.

As illustrated in (b) in FIG. 1, coils wound around the outer salient poles 22, 23 are wound in the same manner, but the outer salient poles 22, 23 are different from each other in connection directions of their respective diodes, which are rectifying devices, are reverse to each other. Similarly, coils wound around the inner salient poles 26, 27 are wound in the same manner, but the inner salient poles 26, 27 are different from each other in connection directions of their respective diodes, which are rectifying devices, are reverse to each other. This is because two salient poles constituting one magnetic pole are configured such that orientations of respective magnetic poles of the salient poles magnetized by induction currents flowing in their respective coils are reverse to each other. In the example of (b), a tip side of the outer salient pole 22 is an N pole, and a tip side of the outer salient pole 23 adjacent thereto is an S pole. Further, a tip side of the inner salient pole 26 is an S pole, and a tip side of the inner salient pole 27 adjacent thereto is an N pole.

As such, a difference between the L-side and the R-side is only that connection directions of respective diodes, which are rectifying devices, are reverse to each other. In view of this, a connection relationship between the coil and the rectifying device is described with reference to the L-side representatively.

The outer rotor coil 24, which is a one-side coil on the O-side, is wound around an L-side outer salient pole 22, and a one-side rectifying device 38 on the O-side is connected to the outer rotor coil 24. In the outer rotor coil 24, which is a one-side coil, a tip-side terminal of the outer salient pole 22 is connected to an anode of the one-side rectifying device 38, and a root-side terminal of the outer salient pole 22 is connected to a cathode of the one-side rectifying device 38. Accordingly, an induction current flows in the outer rotor coil 24, which is a one-side coil on the O-side, in a spiral manner from a root side of the outer salient pole 22 toward a tip side thereof, and hereby, the outer salient pole 22 is magnetized such that the tip side thereof becomes an N pole and the root side thereof becomes an S pole.

The inner rotor coil 28, which is a one-side coil on the I-side, is wound around an L-side inner salient pole 26, and a one-side rectifying device 40 on the I-side is connected to the inner rotor coil 28. In the inner rotor coil 28, which is a one-side coil, a root-side terminal of the inner salient pole 26 is connected to an anode of the one-side rectifying device 40, and a tip-side terminal of the inner salient pole 26 is connected to a cathode of the one-side rectifying device 40. Accordingly, an induction current flows in the inner rotor coil 28, which is a one-side coil on the I-side, in a spiral manner from a tip side of the inner salient pole 26 toward a root side, and hereby, the inner salient pole 26 is magnetized such that the tip side thereof becomes an S pole and the root side thereof becomes an N pole.

The outer rotor coil 24, which is a one-side coil on the O-side, and the one-side rectifying device 38 constitute a one-side winding circuit 42 on the O-side, and the inner rotor coil 28, which is a one-side coil on the I-side, and the one-side rectifying device 40 constitute a one-side winding circuit 44 on the I-side.

In terms of the R-side, the outer salient pole 23 on the O-side is an other-side salient pole, and an other-side winding circuit on the O-side constituted by an other-side coil and an other-side rectifying device on the O-side is placed therein. Similarly, the inner salient pole 27 on the I-side is an other-side salient pole, and an other-side winding circuit on the I-side constituted by an other-side coil and an other-side rectifying device on the I-side is placed therein.

Since a connection direction of the other-side rectifying device to the other-side coil on the O-side is reverse to a connection direction of the one-side rectifying device 38 to the outer rotor coil 24, which is a one-side coil on the O-side, an induction current flows in the other-side coil on the O-side in a spiral manner from a tip side of the outer salient pole 23 toward a root side thereof, and hereby, the outer salient pole 23 is magnetized such that the tip side thereof becomes an S pole and the root side thereof becomes an N pole.

Since a connection direction of the other-side rectifying device to the other-side coil on the I-side is reverse to a connection direction of the one-side rectifying device 40 to the inner rotor coil 28, which is a one-side coil on the I-side, an induction current flows in the other-side coil on the I-side in a spiral manner from a root side of the inner salient pole 27 toward a tip side thereof, and hereby, the inner salient pole 27 is magnetized such that the tip side thereof becomes an N pole and the root side thereof becomes an S pole.

A configuration of (c) in FIG. 1 is changed from the basic configuration of (b) such that an O-side one-side winding circuit 42 and an I-side one-side winding circuit 44 both on the L-side, are connected in parallel to each other, and similarly, an O-side other-side winding circuit and an I-side other-side winding circuit on the I-side, both on the R-side, are connected in parallel to each other. As compared with (b), in the configuration of (c), the number of rectifying devices on the L-side is changed to one from two, and the number of rectifying devices on the R-side is changed to one from two. This makes it possible to reduce cost.

A configuration of (d) in FIG. 1 is changed from the basic configuration of (b) such that an O-side one-side winding circuit 42 and an I-side one-side winding circuit 44, both on the L-side, are connected in series to each other, and similarly, an O-side other-side winding circuit and an I-side other-side winding circuit, both on the R-side, are connected in series to each other. As compared with (b), in the configuration of (d), the number of rectifying devices on the L-side is changed to one from two, and the number of rectifying devices on the R-side is changed to one from two. This makes it possible to reduce cost.

A configuration of (e) in FIG. 1 is changed from the basic configuration of (b) such that a one-side coil is divided into an induction coil and a common coil on the O-side. In terms of the outer rotor coil 24, which is a one-side coil on the L-side, an induction coil 46 is placed on the tip side of the outer salient pole 22, and a common coil 48 is placed on the root side. Similarly to an other-side coil on the R-side, an induction coil is placed on the tip side of the outer salient pole 23, and a common coil is placed on the root side.

An induction current generated by a field system from a stator becomes stronger on a tip end of the salient pole, but becomes weaker on the root side. Accordingly, a main role of the induction coil is to generate an induction current by the field system from the stator, and a main role of the common coil is to magnetize the salient pole by the induction current so that the salient pole serves as a magnetic pole. By setting a ratio between a winding number of the induction coil and a winding number of the common coil appropriately, it is possible to achieve improvement of an output of the rotary electric machine 10. According to the experiment, a ratio between the winding number of the induction coil and the winding number of the common coil is preferably around 3:7. In the example of (e) in FIG. 1, the winding number of the induction coil is one, and the winding number of the common coil is two, as a model.

A configuration of (f) in FIG. 1 is changed from the basic configuration of (b) such that a one-side coil is divided into an induction coil and a common coil on either of the O-side and the I-side.

(g) in FIG. 1 is a view in which, in terms of (f) in FIG. 1, a winding circuit on the L-side is connected to a winding circuit on the R-side so as to connect a common coil on the L-side in series to a common coil on the R-side, thereby forming one T-shaped circuit on the O-side and one T-shaped circuit on the I-side. In (b) to (f) in FIG. 1, the L-side and the R-side are independent from each other, so that an induction current is half-wave rectified by a rectifying device. In contrast, in (g), the common coil on the L-side is connected in series to the common coil on the R-side, so that an induction current is full-wave rectified in each salient pole. Hereby, the output of the rotary electric machine 10 is largely improved. Details of (g) including the configuration of the T-shaped circuit will be described later with reference to FIG. 3.

(h) in FIG. 1 is a configuration diagram in which the T-shaped circuit on the O-side is connected in parallel to the T-shaped circuit on the I-side in terms of (g), and (i) in FIG. 1 is a configuration diagram in which the T-shaped circuit on the O-side is connected in series to the T-shaped circuit on the I-side in terms of (g). Thus, when the O-side and the I-side are connected in parallel or in series to each other, the number of rectifying devices can be made half as has been described in (c), (d). Details of (h) will be described with reference to FIG. 4. Details of (i) will be described with reference to FIG. 5.

(j) in FIG. 1 is a view illustrating a configuration in which an induction coil on the I-side is omitted in terms of (i). In this configuration, four coils, i.e., an L-side common coil and an R-side common coil on the O-side, and a one-side coil and an other-side coil on the I-side are connected in series to each other, so as to form a common coil portion. As compared with (i), no induction coil is placed on the I-side in (j), so that a winding number of the one-side coil and a winding number of the other-side coil can be increased by just that much, thereby making it possible to achieve stronger magnetization of each salient pole. Hereby, the output of the rotary electric machine 10 is improved. Details of (j) will be described with reference to FIG. 6.

Figure 2:
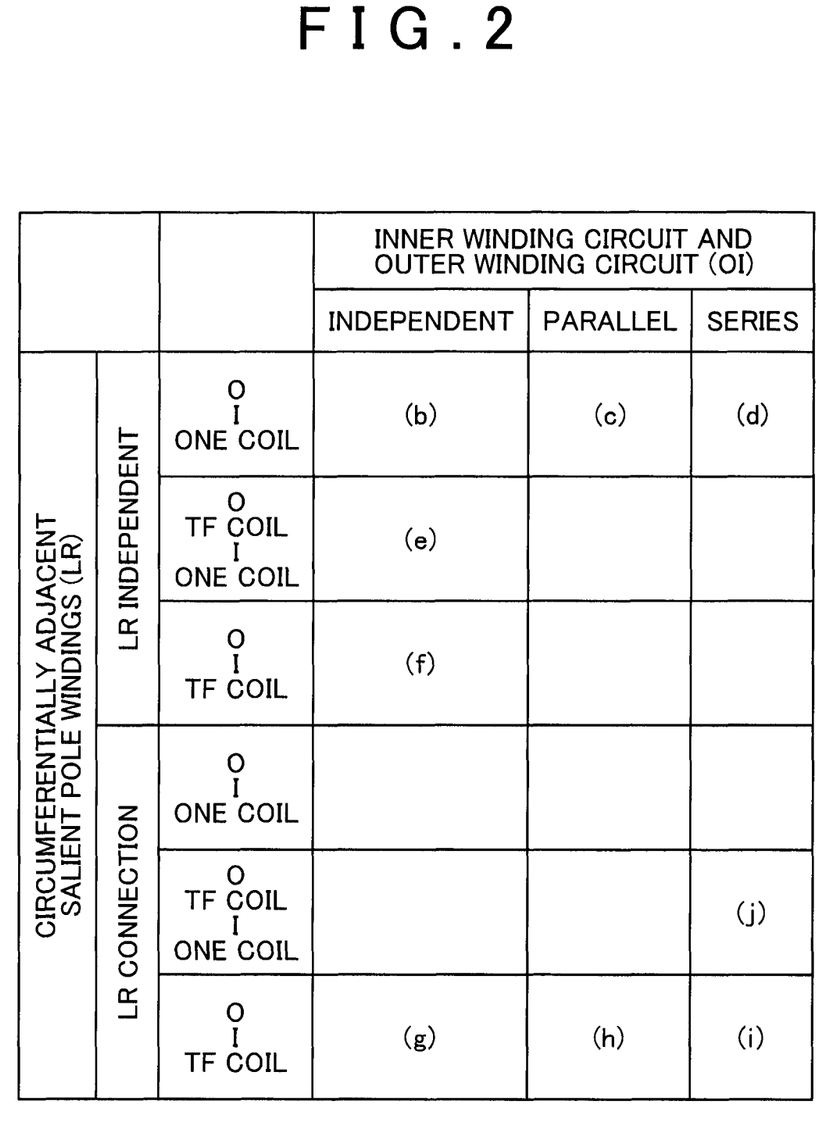
FIG. 2 is a view illustrating 18 exemplary configurations of winding circuits about a magnetless rotary electric machine according to the embodiment of the present invention, and illustrating exemplary configurations corresponding to (b) to (j) in FIG. 1 among the 18 exemplary configurations.

As describe in (c) to (j) in FIG. 1, various exemplary configurations can be made from the basic configuration in (b). FIG. 2 summarizes the exemplary configurations. A horizontal axis of FIG. 2 indicates whether a winding circuit on the O-side and a winding circuit on the I-side are provided independently, or connected in parallel, or connected in series. A vertical axis indicates whether a coil wound around a salient pole is provided as one continuous body or divided into an induction coil and a common coil, and also indicates whether or not a winding circuit on the L-side is connected to a winding circuit on the R-side.

According to the sorting illustrated in FIG. 2, 18 exemplary configurations can be considered. FIG. 2 illustrates which one of the 18 exemplary configurations corresponds to each of the exemplary configurations of (b) to (j) in FIG. 1. From the viewpoint of the improvement in the output of the rotary electric machine 10, the configurations of (h) to (j) are considered preferable. Among these configurations, the configurations of (g) to (j) are slightly complicated, so they are described further more specifically with reference to FIGS. 3 to 6.

Figure 3:
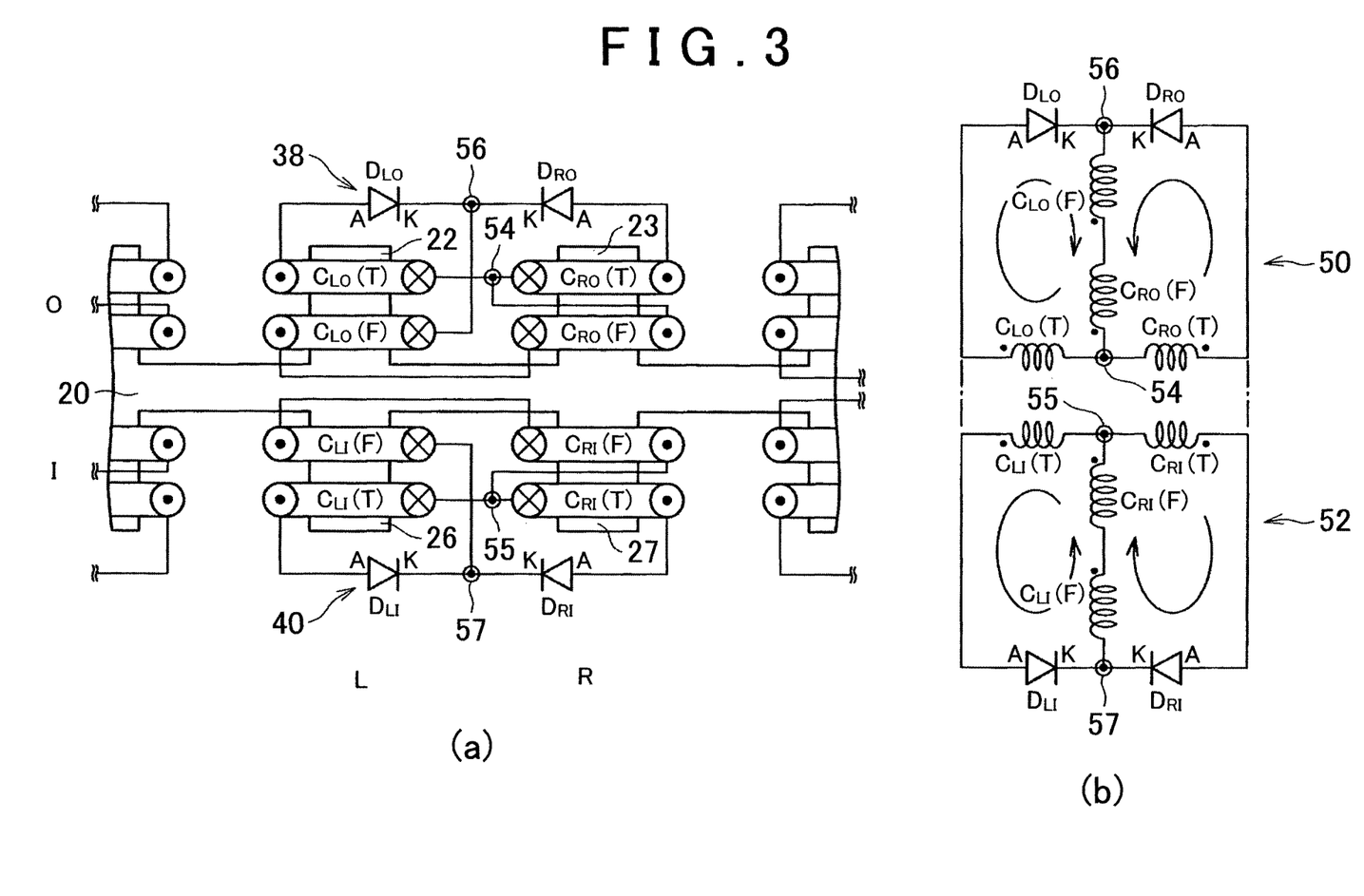
FIG. 3 is a detail drawing of (g) in FIG. 1: (a) in FIG. 3 is a connection diagram; and (b) in FIG. 3 is an equivalent circuit diagram.

FIG. 3 is a view illustrating details of the configuration of (g) in FIG. 1. (a) in FIG. 3 is a connection diagram and (b) in FIG. 3 is an equivalent circuit diagram. In (a) in FIG. 3, the O-side and the I-side are illustrated across the annular rotor yoke portion 20, and the outer salient pole 22 as a one-side salient pole and the outer salient pole 23 as an other-side salient pole, both on the O-side, and the inner salient pole 26 as a one-side salient pole and the inner salient pole 27 as an other-side salient pole, both on the I-side, are illustrated.

Here, an induction coil wound around the outer salient pole 22, which is a one-side salient pole on the O-side, is indicated by $C_{LO}(T)$, and a common coil therearound is indicated by $C_{LO}(F)$. C means a coil, L means the L-side, O means the O-side, T means a tip side and indicates an induction coil, and F means a root side and indicates a common coil. In the following description, an induction coil wound around the outer salient pole 23, which is an other-side salient pole on the O-side, is indicated by $C_{RO}(T)$, a common coil wound therearound is indicated by $C_{RO}(F)$, an induction coil wound around the inner salient pole 26, which is a one-side salient pole on the I-side, is indicated by $C_{LI}(T)$, a common coil wound therearound is indicated by $C_{LI}(F)$, an induction coil wound around the outer salient pole 23, which is an other-side salient pole on the I-side, is indicated by $C_{RI}(T)$, and a common coil wound therearound is indicated by $C_{RI}(F)$. A one-side rectifying device 38 on the O-side is indicated by $D_{LO}$, and a one-side rectifying device 40 on the I-side is indicated by DLI. Hereby, D indicates a diode, and L, O, I indicate the L-side, the O-side, and the I-side, respectively. Similarly, an other-side rectifying device on the O-side is indicated by $D_{RO}$, and an other-side rectifying device on the I-side is indicated by $D_{RI}$.

In (a) in FIG. 3, "a black circle in a circle" and "a cross mark in a circle" on both terminals of each of the coils $C_{LO}(T)$, $C_{LO}(F)$, $C_{RO}(T)$, $C_{RO}(F)$, $C_{LI}(T)$, $C_{LI}(F)$, $C_{LI}(T)$, $C_{RI}(F)$ each indicate a winding direction of a coil. The "black circle in a circle" indicates that a winding passes from the other side of a plane of paper to a near side of the plane of paper, and the "cross mark in a circle" indicates that a winding passes from the near side of the plane of paper to the other side of the plane of paper. Herein, a terminal of the "black circle in a circle" is referred to as one terminal of each coil, and a terminal of "cross mark in a circle" is referred to as the other terminal of each coil. In (b) in FIG. 3, a "black circle" indicates a one-terminal-side of each coil. "A" in each rectifying device $D_{LO}$, $D_{RO}$, $D_{LI}$, $D_{RI}$ indicates an anode, and "K" therein indicates a cathode. This applies to FIGS. 4 to 6.

As described in (g) in FIG. 1, in FIG. 3, a coil wound around each salient pole is divided into an induction coil and a common coil, an L-side winding circuit and an R-side winding circuit, both on the O-side, are connected to each other so as to configure a T-shaped circuit on the O-side, and similarly, an L-side winding circuit and an R-side winding circuit, both on the I-side, are connected to each other so as to configure a T-shaped circuit on the I-side.

A basic configuration for (g) in FIG. 1 is a configuration in (f) in FIG. 1. In (f), on both the O-side and the I-side, an L-side winding circuit and an R-side winding circuit are independent from each other. For example, the L-side winding circuit on the O-side generates an induction current by the induction coil in the outer salient pole 22, which is a one-side salient pole, so that the outer salient pole 22 is magnetized by the common coil. The induction current flowing through the induction coil is rectified by a rectifying device, so that the induction current is half-wave rectified such that the current flows for a half period, but no current flows for the other half period. The magnetization of the outer salient pole 22 is performed only for the half period. Similarly, in the outer salient pole 23, which is an other-side salient pole, an induction current is half-wave rectified such that a current flows for a half period, but no current flows for the other half period. The magnetization of the outer salient pole 23 is also performed only for the half period. Respective phases of the half period during which the outer salient pole 22 is magnetized and the half period during which the outer salient pole 23 is magnetized are shifted from each other, so that the half period during which the outer salient pole 22 is not magnetized generally corresponds to the half period during which the outer salient pole 23 is magnetized.

In (g) in FIG. 1, the common coil in the coil wound around the outer salient pole 22 is connected in series to the common coil wound around the outer salient pole 23, so as to incorporate two induction currents half-wave rectified so as to form an induction current full-wave rectified. Hereby, magnetization periods for the outer salient poles 22, 23 on the O-side are lengthened, thereby achieving improvement of an output of the rotary electric machine 10. Accordingly, the T-shaped circuit has such a configuration that a common coil wound around an L-side salient pole is connected in series to a common coil wound around an R-side salient pole, so as to form a common coil portion, so that an induction current from an induction coil wound around the L-side salient pole and an induction current from an induction coil wound around the R-side salient pole flow into the common coil portion.

The configuration of the T-shaped circuit is described with reference to (b) of FIG. 3. An equivalent circuit diagram on an upper-side in (b) in FIG. 3 indicates a T-shaped circuit 50 on the O-side, and an equivalent circuit diagram on a lower-side therein indicates a T-shaped circuit 52 on the I-side. Since the T-shaped circuit 50 on the O-side and the T-shaped circuit 52 on the I-side are symmetric, the following describes the T-shaped circuit 50 on the O-side.

Herein, a one-side common coil $C_{LO}(F)$ of a one-side winding circuit is connected in series to an other-side common coil $C_{RO}(F)$ of an other-side winding circuit, so as to form a common coil portion. Further, one terminal of a one-side induction coil $C_{LO}(T)$ of the one-side winding circuit is connected to an anode A of a one-side rectifying device $D_{LO}$, and one terminal of an other-side induction coil $C_{RO}(T)$ of the other-side winding circuit is connected to an anode A of an other-side rectifying device $D_{RO}$. Then, the other terminal of the one-side induction coil $C_{LO}(T)$ and the other terminal of the other-side induction coil $C_{RO}(T)$ are connected to one terminal of the common coil portion. That is, the one terminal of the common coil portion is connected to a connecting point 54 of a series connection between the one-side induction coil $C_{LO}(T)$ and the other-side induction coil $C_{RO}(T)$. Further, a cathode K of the one-side rectifying device $D_{LO}$ and a cathode K of the other-side rectifying device $D_{RO}$ are connected to the other terminal of the common coil portion. That is, the other terminal of the common coil portion is connected to a connecting point 56 between the one-side rectifying device $D_{LO}$ and the other-side rectifying device $D_{RO}$.

Since a series connection between two common coils $C_{LO}(F)$ and $C_{RO}(F)$ is connected to the connecting point 54 of a series connection between two induction coils $C_{LO}(T)$ and $C_{RO}(T)$ so as to form a T-shape, the circuit formed hereby is called "T-shaped circuit." Similarly, in terms of the I-side, a series connection between two common coils $C_{LI}(F)$ and $C_{LI}(F)$ is connected to a connecting point 55 of a series connection between two induction coils $C_{LI}(T)$ and $C_{RI}(T)$ so as to form a T-shape of the T-shaped circuit 52. Note that a connecting point 57 between two rectifying devices $D_{LI}$, $D_{RI}$ on the I-side is shown corresponding to the connecting point 56 between two rectifying devices $D_{LO}$, $D_{RO}$ on the O-side.

In (b) in FIG. 3, a direction where an induction current flows is indicated by an arrow. In terms of the O-side, respective induction currents from two induction coils $C_{LO}$(T) and $C_{RO}(T)$ flow into the common coil portion formed by connecting two common coils $C_{LO}(F)$ and $C_{RO}(F)$ in series to each other. Similarly, in terms of the I-side, respective induction currents from two induction coils $C_{LI}$(T) and $C_{RI}(T)$ flow into the common coil portion formed by connecting two common coils $C_{LI}(F)$ and $C_{RI}(F)$ in series to each other. Hereby, the induction current half-wave rectified and flowing from the L-side induction coil and the induction current half-wave rectified and flowing from the R-side induction coil are incorporated so as to form a full-wave rectified induction current, thereby improving an output of the rotary electric machine 10.

Figure 4:
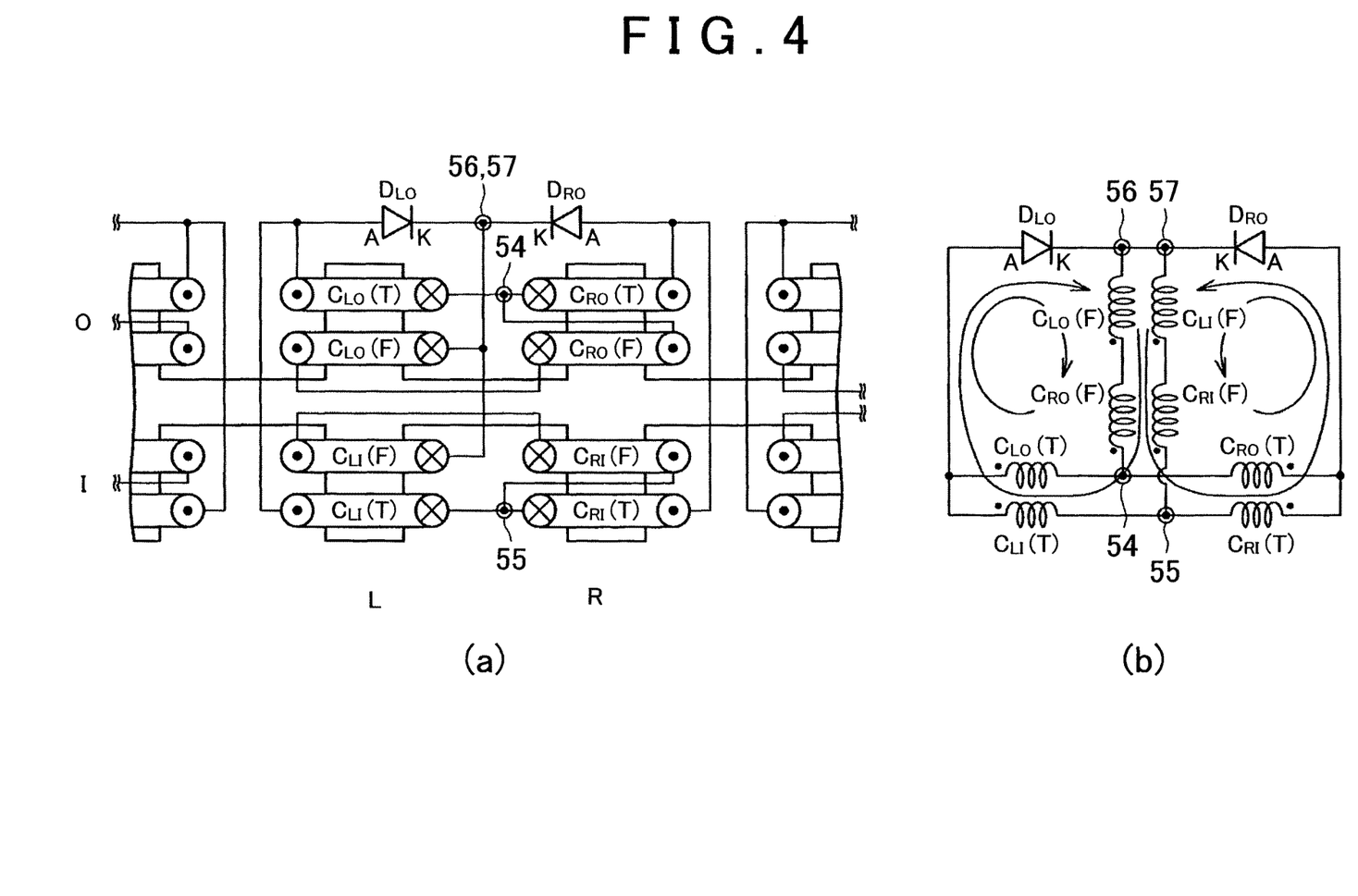
FIG. 4 is a detail drawing of (h) in FIG. 1: (a) in FIG. 4 is a connection diagram; and (b) in FIG. 4 is an equivalent circuit diagram.
Figure 5:
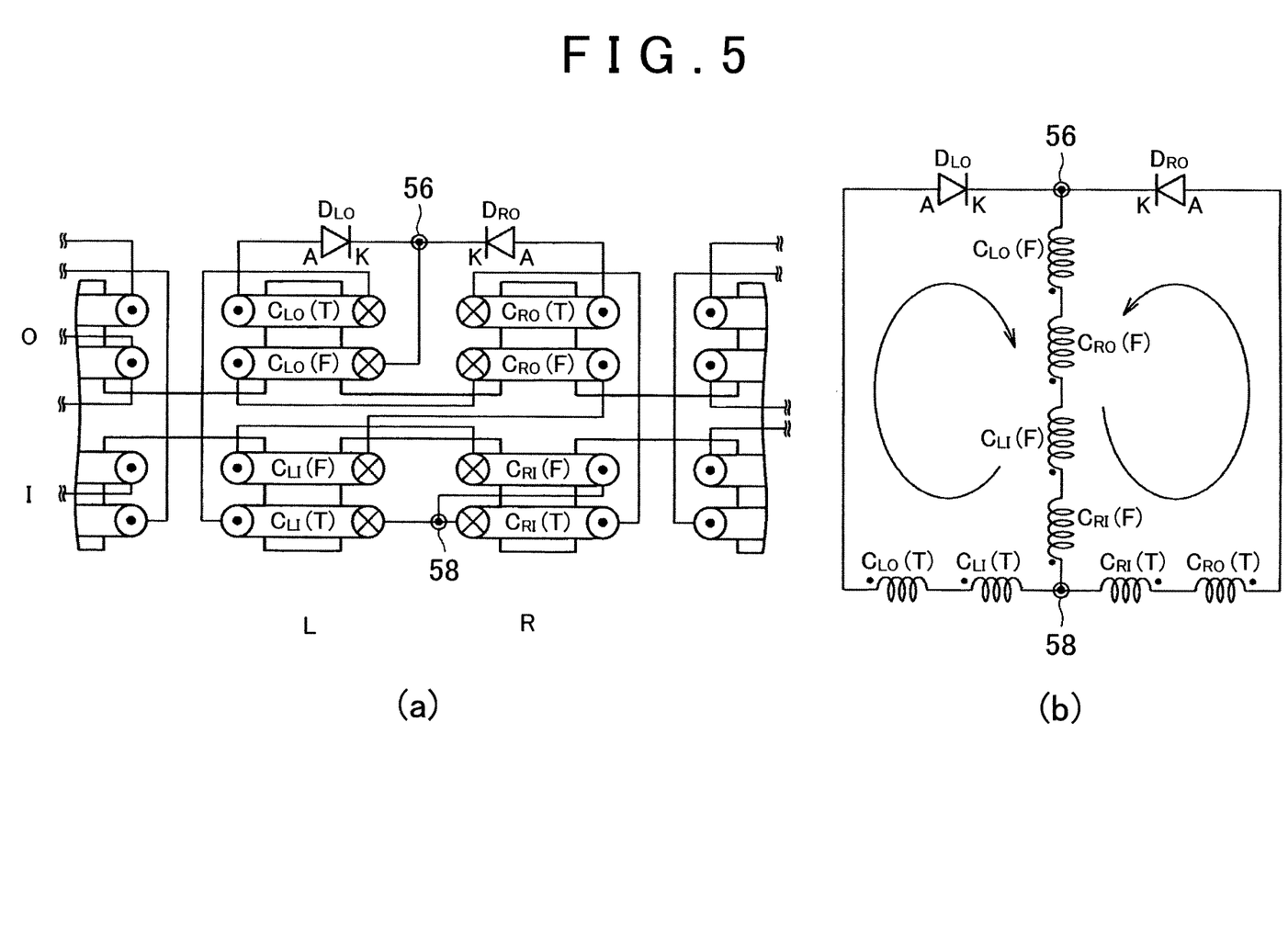
FIG. 5 is a detail drawing of (i) in FIG. 1: (a) in FIG. 5 is a connection diagram; and (b) in FIG. 5 is an equivalent circuit diagram.

FIG. 4 is a detail view of (h) in FIG. 1, and FIG. 5 is a detail view of (i) in FIG. 1. As illustrated in FIG. 2, these two configurations are obtained such that the T-shaped circuit 50 on the O-side and the T-shaped circuit 52 on the I-side, which are described in FIG. 3, are connected in parallel to each other, and the number of rectifying devices can be reduced to half of the basic configuration of FIG. 3.

A configuration of FIG. 4 is such that the T-shaped circuit 50 on the O-side and the T-shaped circuit 52 on the I-side in the basic configuration in FIG. 3 are connected in parallel to each other. As illustrated in a connection diagram of (a) in FIG. 4 and an equivalent circuit diagram of (b) in FIG. 4, a connecting point 56 between two rectifying devices $D_{LO}$, $D_{RO}$ on the O-side is connected to a connecting point 57 between two rectifying devices $D_{LO}$, $D_{RO}$ on the I-side. However, a connecting point 54 between two induction coils $C_{LO}(T)$ and $C_{RO}(T)$ on the O-side and a connecting point 55 between two induction coils $C_{LI}(T)$ and $C_{RI}(T)$ on the I-side are independent from each other, and are not connected to each other. Then, one terminal of the induction coil $C_{LO}(T)$ on the O-side and one terminal of the induction coil $C_{LI}(T)$ on the I-side are connected to each other, and one terminal of the induction coil $C_{RO}(T)$ on the O-side and one terminal of the induction coil $C_{RI}(T)$ on the I-side are connected to each other. Hereby, the T-shaped circuit 50 on the O-side and the T-shaped circuit 52 on the I-side are connected in parallel to each other, so that rectifying devices $D_{LI}$, $D_{RI}$ on the I-side can be omitted.

A configuration of FIG. 5 is such that the T-shaped circuit 50 on the O-side and the T-shaped circuit 52 on the I-side in the basic configuration in FIG. 3 are connected in series to each other. As illustrated in a connection diagram of (a) in FIG. 5 and an equivalent circuit diagram of (b) in FIG. 5, two common coils $C_{LO}(F)$, $C_{RO}(F)$ on the O-side and two common coils $C_{LI}(F)$, $C_{RI}(F)$ on the I-side are connected in series to each other, so as to form one common coil portion. Further, two induction coils $C_{LO}(T)$, $C_{LI}(T)$ on the L-side are connected in series each other, and the other terminal of that series connection is connected, via a connecting point 58, to the other terminal of a series connection between two induction coils $C_{RO}(T)$, $C_{RI}(T)$ on the R-side. One terminal of the common coil portion is connected to the connecting point 58, and the other terminal of the common coil portion is connected to a connecting point 56 between respective cathodes K of two rectifying devices $D_{LO}$, $D_{RO}$. An anode A of the rectifying device $D_{LO}$ is connected to one terminal of an L-side induction coil $C_{LO}(T)$ on the O-side, and an anode A of the rectifying device $D_{RO}$ is connected to one terminal of an R-side induction coil $C_{RO}(T)$ on the O-side. Hereby, the T-shaped circuit 50 on the O-side is connected in series to the T-shaped circuit 52 on the I-side, so that the rectifying devices $D_{LI}$, $D_{RI}$ on the I-side can be omitted.

Figure 6:
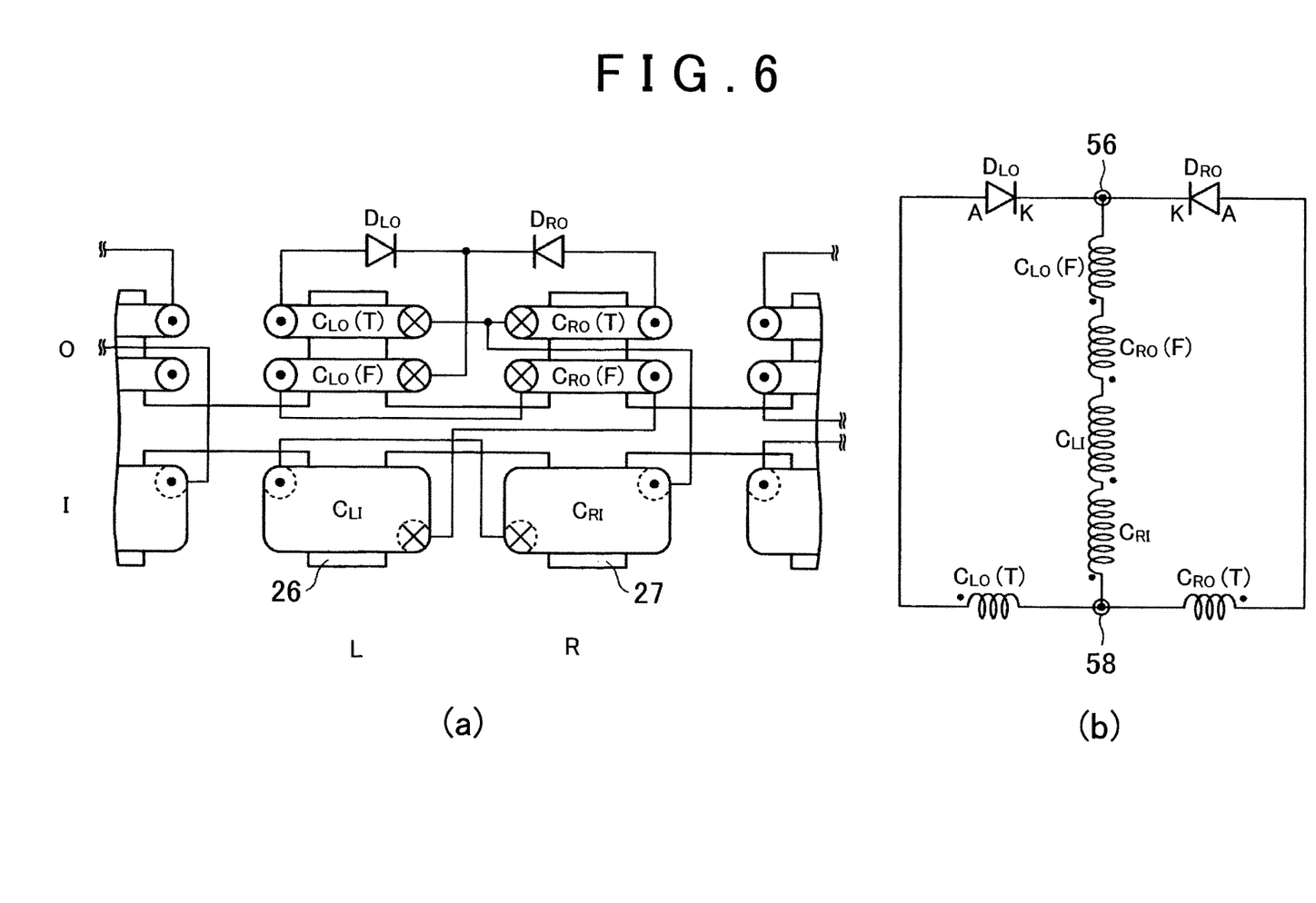
FIG. 6 is a detail drawing of (j) in FIG. 1: (a) in FIG. 6 is a connection diagram; and (b) in FIG. 6 is an equivalent circuit diagram.

FIG. 6 is a detail view of (j) in FIG. 1. When FIG. 6 is compared with FIG. 5, the induction coils $C_{LI}(T)$, $C_{RI}(T)$ on the I-side are omitted, and normal coils $C_{LI}$, $C_{RI}$ in which an induction coil is not distinguished from a common coil are used instead. That is, respective windings are continuously wound around the inner salient poles 26, 27 on the I-side. Since the induction coils are omitted, winding numbers of the windings are larger than a winding number of the common coil by just that much. For example, when a winding number of a winding that can be wound around one salient is 10, a winding number of the induction coil is 3, and a winding number of the common coil is 7, winding numbers of the normal coils $C_{LI}$, $C_{RI}$ can be set to 10, which is larger than 7 as the winding number of the common coil.

As illustrated in (b) in FIG. 6, a common coil portion is configured such that a common coil $C_{LO}(F)$ on the L-side and a common coil $C_{RO}(F)$ on the R-side are connected in series to the normal coils $C_{LI}$ and $C_{RI}$. As described above, when the winding number of the winding that can be wound around one salient is 10, the winding number of the induction coil is 3, and the winding number of the common coil is 7, a total winding number of the common coil portion of FIG. 6 is 34 (=7+7+10+10). In contrast, a total winding number of the common coil portion in FIG. 5 is 28 (=7+7+7+7). When it is considered that a magnetomotive force to the salient pole of the common coil portion is proportional to the winding number of the coil, a magnetomotive force of the common coil portion of the configuration in FIG. 6 is 1.2 (=34/28) times a magnetomotive force of the common coil portion of the configuration in FIG. 5.

Since the induction coils $C_{LI}(T)$, $C_{RI}(T)$ on the I-side are omitted in FIG. 6, it is considered that a magnitude of an induction current generated by the induction coil is smaller than a case of FIG. 5. However, the induction current is also generated by the normal coils $C_{LI}$, $C_{RI}$, so a difference therebetween is small. In view of this, with all things considered, a magnetic-pole characteristic of each salient pole is improved in the configuration of FIG. 6 in comparison with the configuration of FIG. 5. Accordingly, the output of the rotary electric machine 10 is improved in the configuration of FIG. 6 in comparison with the configuration of FIG. 5.

As described above, from the viewpoint of the improvement in the output of the rotary electric machine 10, the improvement in the configurations of FIGS. 4, 5 is at the same level as the configuration of FIG. 3. However, in comparison with this, the output of the rotary electric machine 10 is further improved in the configuration of FIG. 6. Further, from the viewpoint of cost of the rotary electric machine 10, reduction in cost can be achieved in configurations of FIGS. 4 to 6 in comparison with the configuration of FIG. 3. Generally, as the rotary electric machine 10, the configuration of FIG. 4 or FIG. 5 is more preferable than the configuration of FIG. 3, and the configuration of FIG. 6 is further more preferable than the configuration of FIG. 4 or FIG. 5.

Figure 7:
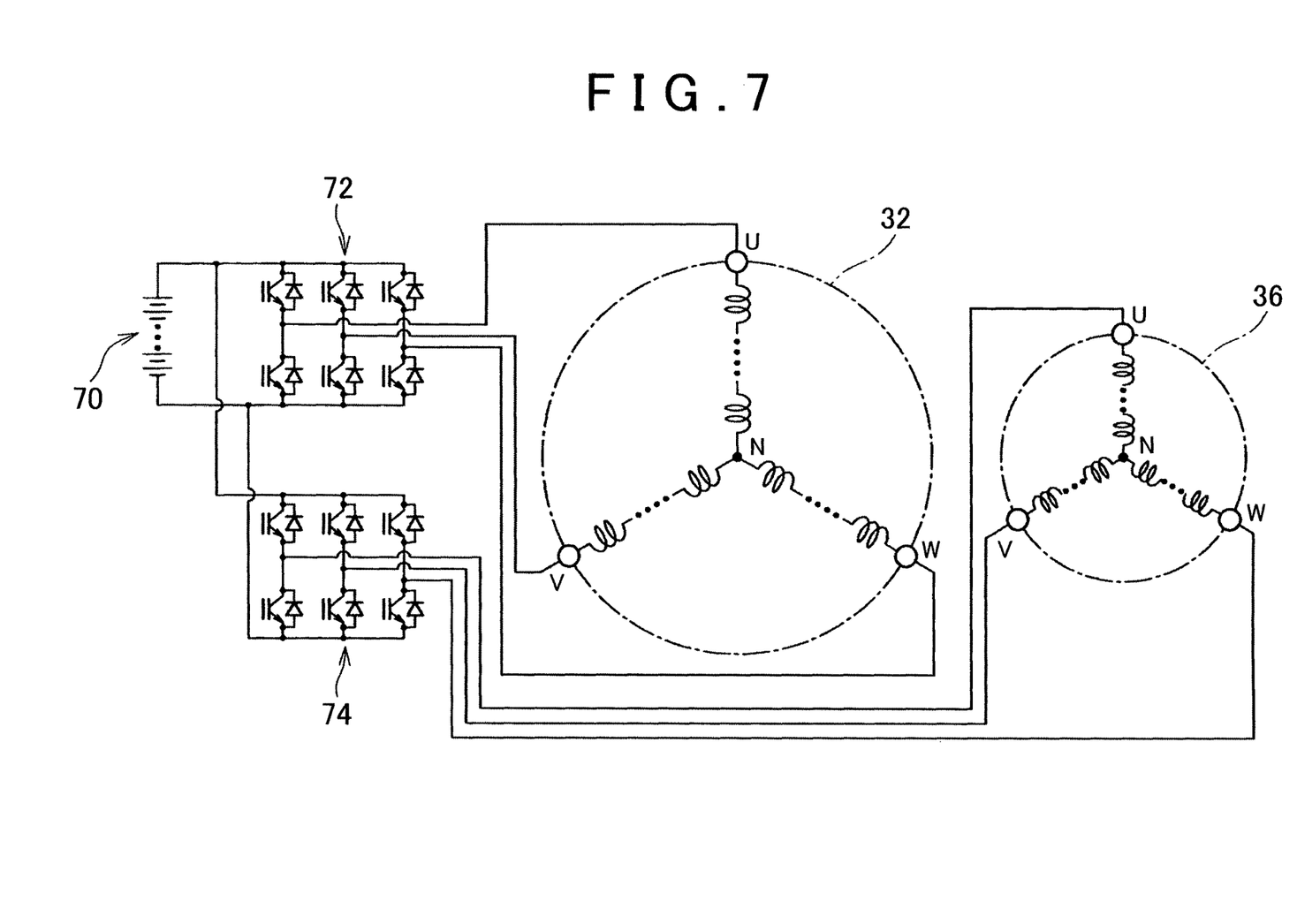
FIG. 7 is a view illustrating two inverter circuits connected to the magnetless rotary electric machine according to the embodiment of the present invention.

FIG. 7 is a view illustrating driving circuits for the outer exciting coil 32 and the inner exciting coil 36. The driving circuit for the outer exciting coil 32 is constituted by a power supply 70, and that three-phase inverter circuit 72 for the outer stator 14 which is connected to the power supply 70.

The driving circuit for the inner exciting coil 36 is constituted by the power supply 70, and that three-phase inverter circuit 74 for the inner stator 16 which is connected to the power supply 70. The three-phase inverter circuits 72, 74 are DC/AC conversion circuits using the power supply 70 in common, connected in parallel to each other, and provided independently. Hereby, the outer exciting coil 32 and the inner exciting coil 36 are independently subjected to a drive control. The drive control is performed by a vehicle drive control portion (not shown).

Figure 8:
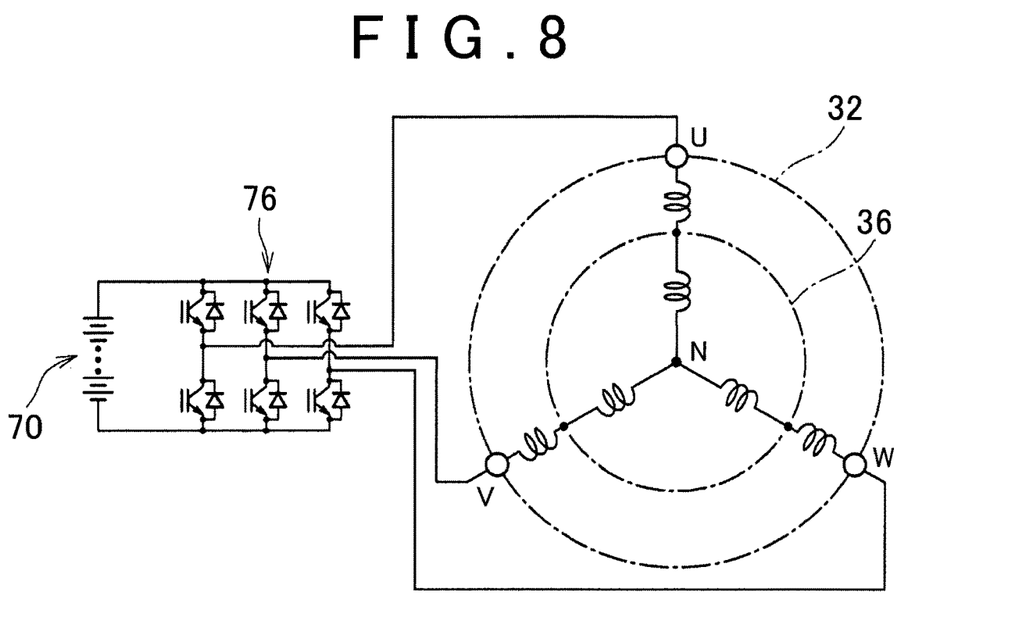
FIG. 8 is a view illustrating one inverter circuit connected to the magnetless rotary electric machine according to the embodiment of the present invention.
Figure 9:
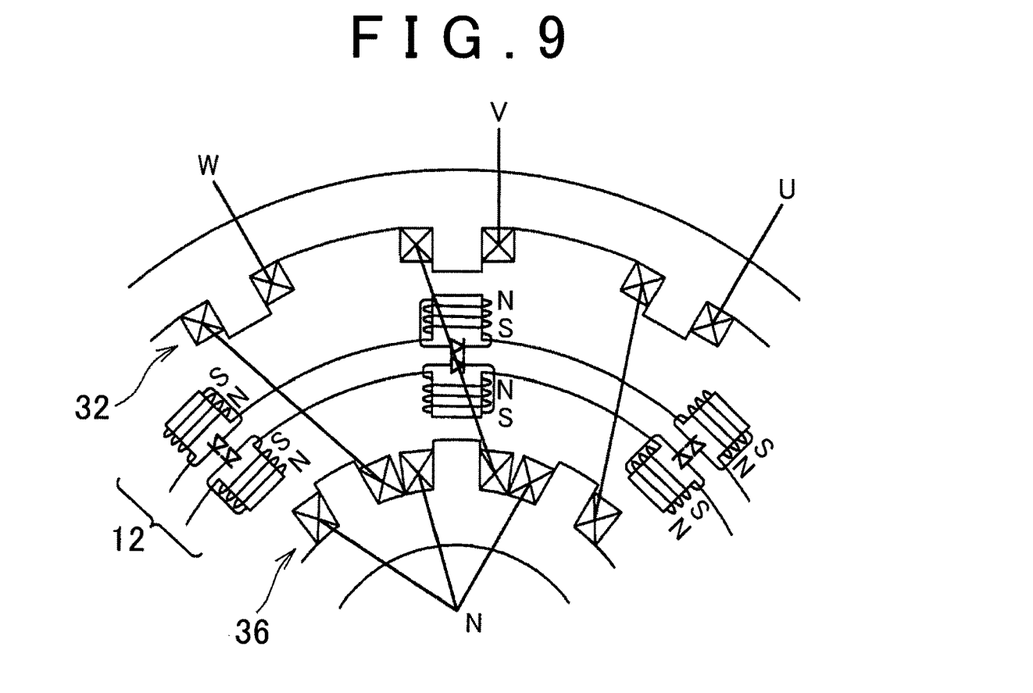
FIG. 9 is a detail drawing of FIG. 8.

The number of poles for the outer exciting coil 32 and the number of poles for the inner exciting coil 36 are the same. Accordingly, in a case of a specification in which the outer exciting coil 32 and the inner exciting coil 36 are driven in synchronous with each other, a three-phase inverter circuit can be used in common. FIG. 8 is a view illustrating a connection relationship between a commonized three-phase inverter circuit 76, the outer exciting coil 32, and the inner exciting coil 36. FIG. 9 is a model view illustrating a connection relationship. As such, one terminals of respective phases of the outer exciting coil 32 are connected to the three-phase inverter circuit 76, the one terminals of respective phases of the outer exciting coil 32 are connected to the other terminals of their corresponding phases of the inner exciting coil 36, and the other terminals of respective phases of the inner exciting coil 36 are connected to each other, so as to form a neutral point N. As such, when the three-phase inverter circuit 76 is commonized, it is possible to reduce the cost of the driving circuit.

Figure 10:
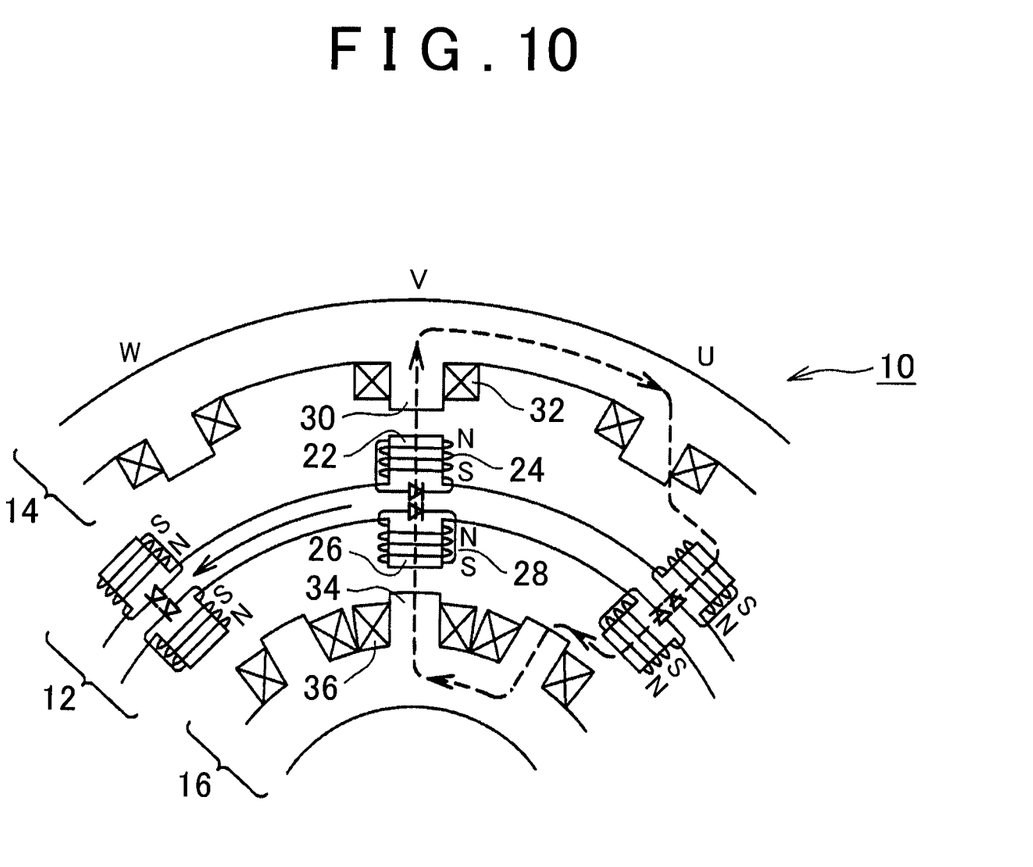
FIG. 10 is a view illustrating a flow of a magnetic flux in the magnetless rotary electric machine according to the embodiment of the present invention.

FIG. 10 is a view illustrating an example of a flow of a magnetic flux in the rotary electric machine 10. Herein, a direction of a magnetic flux formed by a V-phase inner exciting coil 36 in the inner stator 16 is the same as a direction of a magnetic flux formed by a V-phase outer exciting coil 32 in the outer stator 14. A flow of the magnetic flux is indicated by a dotted arrow. Along the dotted arrow, the magnetic flux flows through a loop in which the magnetic flux enters from a V-phase inner stator salient pole 34 of the inner stator 16 into that inner salient pole 26 of the annular rotor 12 which faces the V-phase inner stator salient pole 34, flows into the outer salient pole 22 so as to enter that V-phase outer stator salient pole 30 of the outer stator 14 which faces the outer salient pole 22, enters a U-phase outer stator salient pole 30 of the outer stator 14 via a yoke portion of the outer stator 14, then enters the outer salient pole 22 and the inner salient pole 26 of the annular rotor 12, and a U-phase inner stator salient pole 34 of the inner stator 16, and finally returns to the V-phase inner stator salient pole 34 via a yoke portion of the inner stator 16.

Due to the magnetic flux formed by the outer exciting coil 32 of the outer stator 14 and the inner exciting coil 36 of the inner stator 16, an induction current flows through a V-phase inner rotor coil 28 and the outer rotor coil 24 of the annular rotor 12. Hereby, the inner salient pole 26 and the outer salient pole 22 of the annular rotor 12 are magnetized, thereby forming magnetic poles along a direction illustrated in FIG. 10. In collaboration with the magnetic poles thus formed in the annular rotor 12 and field systems from the outer stator 14 and the inner stator 16, the annular rotor 12 rotates along a direction indicated by an arrow of a continuous line as illustrated in FIG. 10, thereby generating a torque. The torque is generated in the magnetless rotary electric machine 10 in this way.

According to the rotary electric machine 10 configured as such, the outer stator 14 and the inner stator 16 are driven, so that a maximum torque is increased to about 1.5 times. Accordingly, when the torque thus increased is maintained at a conventional rated value, a maximum current can be reduced, thereby making it possible to reduce copper loss of a rotor coil. Thus, it is possible to improve the output of the rotary electric machine 10. Further, it is possible to reduce a size of the rotary electric machine 10. Further, by connecting an L-side winding circuit and an R-side winding circuit provided in salient poles adjacent to each other along a circumferential direction, the number of diodes can be reduced, thereby achieving low cost.

The invention claimed is:

1. A magnetless rotary electric machine, comprising:
    an annular rotor including:
        an annular rotor yoke portion;
        outer salient poles provided on a radially outer side of the rotor yoke portion;
        outer rotor coils wound around the outer salient poles, respectively;
        inner salient poles provided on a radially inner side of the rotor yoke portion;
        inner rotor coils wound around the inner salient poles, respectively;
        first rectifying devices; and
        second rectifying devices;
    an outer stator placed so as to face a radially outer side of the annular rotor, the outer stator including outer exciting coils; and
    an inner stator placed so as to face a radially inner side of the annular rotor, the inner stator including inner exciting coils,
    wherein the inner salient poles and the outer salient poles each include a first salient pole and a second salient pole adjacent to each other,
    a first coil is wound around the first salient pole and a second coil is wound around the second salient pole,
    the first salient pole is configured to be magnetized by an induction current induced by the first coil,
    each of the first rectifying devices is configured to rectify current such that a direction of a magnetic pole of the first salient pole is a first direction;
    the second salient pole is configured to be magnetized by an induction current induced by the second coil,
    each of the second rectifying devices is configured to rectify current such that a direction of a magnetic pole of the second salient pole is a second direction, and
    the second direction is a reverse direction to the first direction, wherein
    each of the first coil and the second coil in at least either ones of the inner salient poles and the outer salient poles includes an induction coil and a common coil,
    the induction coil is wound around a tip side of each of the first salient pole and the second salient pole, and
    the common coil is wound around a root side of each of the first salient pole and the second salient pole in the same winding direction as a winding direction of the induction coil,
    wherein
    each of the inner salient poles and the outer salient pole includes a first winding circuit and a second winding circuit,
    the first winding circuit includes the first coil and the first rectifying device,
    the second winding circuit includes the second coil and the second rectifying device,
    each of the first coil and the second coil includes the induction coil and the common coil,
    the first winding circuit is connected to the second winding circuit so as to form a T-shape, a common coil portion includes a first common coil of the first winding circuit and a second common coil of the second winding circuit, the first common coil is connected in series to the second common coil, a first terminal of a first induction coil of the first winding circuit is connected to an anode of the first rectifying device, a first terminal of a second induction coil of the second winding circuit is connected to an anode of the second rectifying device, a second terminal of the first induction coil and a second terminal of the second induction coil are connected to a first terminal of the common coil portion, and a cathode of the first rectifying device and a cathode of the second rectifying device are connected to a second terminal of the common coil portion wherein an inner T-shaped circuit of the inner salient pole is connected in parallel or in series to an outer T-shaped circuit of the outer salient pole, such that one first rectifying device and one second rectifying device are arranged in a pair of the inner T-shaped circuit and the outer T-shaped circuit.

2. A magnetless rotary electric machine, comprising:

an annular rotor including:
- an annular rotor yoke portion;
- outer salient poles provided on a radially outer side of the rotor yoke portion;
- outer rotor coils wound around the outer salient poles, respectively;
- inner salient poles provided on a radially inner side of the rotor yoke portion;
- inner rotor coils wound around the inner salient poles, respectively;
- first rectifying devices; and
- second rectifying devices;

an outer stator placed so as to face a radially outer side of the annular rotor, the outer stator including outer exciting coils; and an inner stator placed so as to face a radially inner side of the annular rotor, the inner stator including inner exciting coils, wherein the inner salient poles and the outer salient poles each include a first salient pole and a second salient pole adjacent to each other, a first coil is wound around the first salient pole and a second coil is wound around the second salient pole, the first salient pole is configured to be magnetized by an induction current induced by the first coil, each of the first rectifying devices is configured to rectify current such that a direction of a magnetic pole of the first salient pole is a first direction;

the second salient pole is configured to be magnetized by an induction current induced by the second coil, each of the second rectifying devices is configured to rectify current such that a direction of a magnetic pole of the second salient pole is a second direction, and the second direction is a reverse direction to the first direction, wherein each of the first coil and the second coil in at least either ones of the inner salient poles and the outer salient poles includes an induction coil and a common coil, the induction coil is wound around a tip side of each of the first salient pole and the second salient pole, and the common coil is wound around a root side of each of the first salient pole and the second salient pole in the same winding direction as a winding direction of the induction coil wherein each of the first coil and the second coil in either ones of the inner salient poles and the outer salient poles includes the induction coil and the common coil, the other ones of the inner salient poles and the outer salient poles include a third coil wound around the first salient pole and a fourth coil wound around the second salient pole, a common coil portion includes a first common coil of the first coil, a second common coil of the second coil, the third coil, and the fourth coil, the first common coil, the second common coil, the third coil, and the fourth coil are connected in series to each other, a first terminal of a first induction coil of the first coil is connected to an anode of the first rectifying device, a first terminal of a second induction coil of the second coil is connected to an anode of the second rectifying device, a cathode of the first rectifying device and a cathode of the second rectifying device are connected to a second terminal of the common coil portion, and a second terminal of the first induction coil and a second terminal of the second induction coil are connected to a first terminal of the common coil portion.

* * * * *